May 2, 1961  W. D. THOMPSON  2,981,956
GLARE SHIELDING DEVICE
Filed Aug. 2, 1957
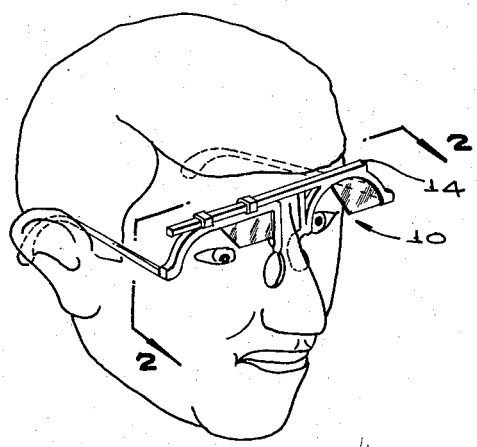
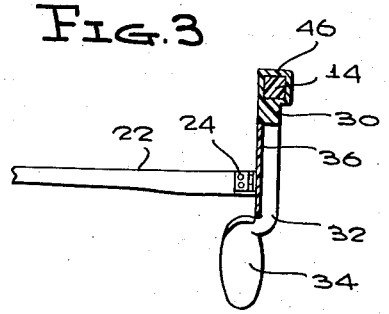
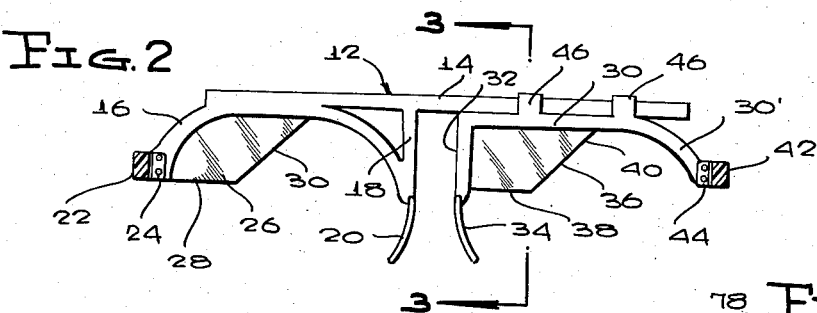
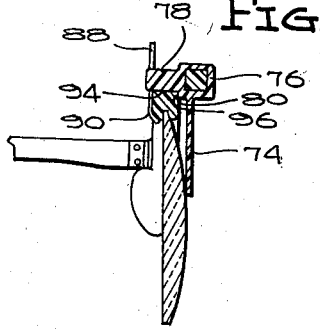
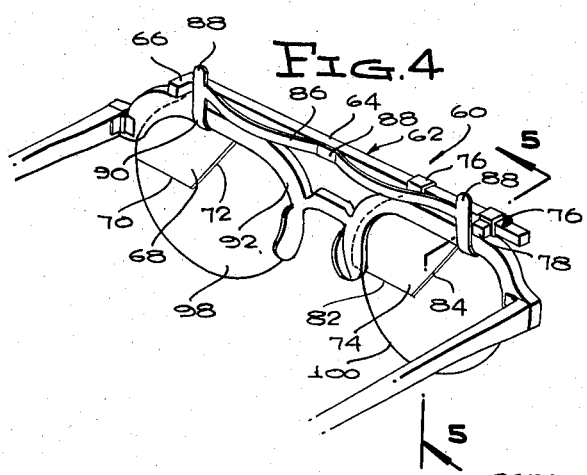
INVENTOR.
WILLIAM D. THOMPSON
BY
McMorrow, Berman & Davidson
ATTORNEYS United States Patent Office 2,981,956
Patented May 2, 1961

2,981,956
GLARE SHIELDING DEVICE
William D. Thompson, Rte. 1, Box 63, Naches, Wash.
Filed Aug. 2, 1957, Ser. No. 675,872
1 Claim. (Cl. 2—13)

This invention relates to an optical device, and more specifically, the present invention pertains to a device for shielding the eyes of the driver of an automobile from the glare of the headlights of an approaching automobile.

One of the primary objects of this invention is to provide an optical device with semi-transparent lenses, which when worn by the driver of an automobile slightly obscures the vision of the left hand side of the road only, so that the driver may observe the right hand side of the road in the usual manner.

Another object of this invention is to provide an optical device for shielding the eyes of the driver of an automobile from the glare from the headlights of an approaching automobile, the device including a pair of colored plastic lenses disposed in front of the eyes of the wearer, the lenses depending from a frame and being of such size as to reduce only slightly the area of the wearer's direct vision.

A further object of this invention is to provide an optical device of the type described, wherein the lenses are mounted on a supporting frame and are adjustable towards and away from each other.

A still further object of this invention is to provide an optical device to shield the eyes of the driver of an automobile from the headlight glare of an approaching automobile, the device including a pair of semi-transparent lenses mounted in the left hand corners of an eye glass frame, the lenses being of such size as to obscure only a small part of the driver's direct vision, and the lenses being provided with straight edges in order to obtain a sharp dividing line in the user's vision.

This invention contemplates, as a further object thereof, the provision of an optical device of the type referred to supra, together with means for releasably securing the device to the frame of a conventional pair of corrective eye glasses.

It is a still further object of this invention to provide an optical device of the kind to which reference has been made above, the device being non-complex in construction and assembly, inexpensive to manufacture, and durable in use.

Other and further objects and advantages of the instant invention will become more evident from a consideration of the following specification when read in conjunction with the annexed drawing, in which:

Figure 1 is a perspective view of an optical device constructed in accordance with the teachings of the present invention;

Figure 2 is a rear elevational view, partly in section, and taken on the vertical plane of line 2—2 of Figure 1 looking in the direction of the arrows;

Figure 3 is an enlarged, fragmentary detailed cross-sectional view taken on the vertical plane of line 3—3 of Figure 2, looking in the direction of the arrows;

Figure 4 is a perspective view of a second embodiment of this invention, the device in this instance being of the type adapted to clip onto a conventional eye glass frame; and Figure 5 is an enlarged detailed cross-sectional view taken substantially on the vertical plane of line 5—5 of Figure 4, looking in the direction of the arrows.

Referring now more specifically to Figures 1 to 3, inclusive, reference numeral 10 designates, in general, an optical device constructed in accordance with this invention. As is seen in these said figures, the optical device 10 comprises a lens frame 12 formed, preferably, of a plastic material. The frame 12 includes an elongated substantially rectangular bar 14 integrally formed with an arcuately shaped lens bracket 16 intermediate the ends thereof. A substantially rectangular brace 18 projects laterally from the bar 14 intermediate its ends, and the brace 18 is integrally connected with the inner end of the arcuately shaped lens bracket 16. An arcuately shaped conventional nose pad 20, also formed of a plastic material, has one of its ends fixedly secured by conventional means to the merged ends of the bracket 16 and brace 18. An elongated temple piece 22 of conventional construction is hingedly connected at 24 to the outer end of the bracket 16. A semi-transparent lens formed of a plastic material is fixedly secured to the bracket 16 by conventional means. As is seen in Figures 1, 2 and 3, inclusive, the lens 26 depends from the upper left hand corner of the bracket 16 and is provided with a lower horizontal end edge 28 and a side edge 29 disposed at an obtuse angle with respect to the edge 28.

A second lens bracket includes a substantially rectangular member 30 having a downwardly bowed outer end 30'. The inner end of the member 30 terminates in a depending flange 32 which projects laterally therefrom at substantially right angles with respect thereto. One end of a second arcuately shaped nose pad 34 is fixedly secured by conventional means to the lower end of the brace 32 and depends therefrom.

Reference numeral 36 denotes a second lens mounted in the upper left hand corner of the second lens bracket by conventional means, the lens 36 being provided with a horizontal lower end edge 38 and an outer side edge 40 disposed at an obtuse angle with respect to the edge 38. A temple piece 42 has one of its end hingedly connected at 44 to the outer end 30' of the member 30.

At longitudinally spaced intervals, the member 30 is provided with a plurality of substantially hollow rectangular sleeves 46 which are adapted to slidably receive therein the free end of the bar 14. The sliding connection between the bar 14 and the sleeves 46 is provided in order to provide means for adjusting the lens 36 relative to the lens 26, and the connection is such that once the adjustment has been made the lenses 26 and 36 will be maintained by friction in their adjusted positions relative to each other.

To utilize the above described optical device, the user first separates the nose pads 20, 34 or moves them together a suitable distance wherein the optical device is comfortably supported on the user's nose in the manner illustrated in Figure 1 of the drawing. Now while driving at night, and to shield the driver's eyes from the glare of the headlights of an approaching automobile, it is only necessary for the driver to turn his head slightly to the right so that the lenses 26, 36 are brought more fully into the direct line of vision. Such action will only slightly reduce the vision of the left hand side of the road but the road, at the right hand side thereof, may be observed as usual.

Reference Figures 4 and 5 disclose a second embodiment of this invention. In this modification, reference numeral 60 designates, in general, an optical device for connection with the frame of conventional corrective eye glasses. The optical device 60 comprises a lens supporting frame 62 which includes an elongated substantially rectangular bar 64 having a laterally projecting end 66 which extends away therefrom at substantially right angles with respect thereto. The bar 64 is formed of a plastic material and is integrally connected with a depending semi-transparent lens 68 having a horizontal lower end edge 70 and a side edge 72 inclined at an obtuse angle with respect to the horizontal end edge 70.

Reference numeral 74 indicates a second lens formed of a semi-transparent material, and the upper end thereof is integrally connected with a plurality of longitudinally spaced substantially hollow rectangular sleeves 76. As is seen in Figure 5 of the drawing, each of the sleeves 76 is integral with a laterally projecting flange 78. The vertical dimensions of the flanges 78 are less than the vertical connections of the sleeves 76 in order to form the shoulder 80, the function of which will be set forth below. The lens 74 is constructed with a horizontal lower end edge 82 and a side edge 84 extending at an obtuse angle with respect to the edge 82.

An elongated substantially rectangular bowed clamp 86 is secured at 87 intermediate its ends to the bar 64 and substantially centrally thereof. Each end of the bowed clamp 86 terminates in a laterally extending upright finger tab 88 and an integrally formed depending clamp member 90. As in the previous embodiment of this invention, the sleeves 76 slidably receive therethrough the outer free end of the rod 64 whereby the lens 74 may be moved towards or away from the lens 68.

The optical device 60 is mounted on the lens frame 92 of a conventional pair of corrective eye glasses by pulling the finger tabs 88 away from the bar 64 and then passing the clamps 90 behind the frame 92 and bringing the laterally projecting end 66 and the flanges 76 into engagement with the upper side 94 thereof with the forward face 96 engaging the shoulder 80. The finger tabs 88 are then released to engage the clamps 90 against the frame 92. To remove the device 60 from the frame 92 it is only necessary to manually move the clamp 90 away from the frame 92 and then move the device 60 upwardly away from the frame 92, reference being made to Figures 4 and 5.

In this embodiment of the invention the lens 68 extend across the upper left hand corner of the corrective lens 98 and the lens 74 is adjusted on the bar 64 to occupy a similar position relative to the corrective lens 100.

The use of this optical device 60 is the same as that described above in connection with the original embodiment of this invention.

Having described and illustrated one embodiment of this invention in detail, it will be understood that the same is offered merely by way of example, and that this invention is to be limited only by the scope of the appended claim.

What is claimed is:

An optical device for shielding the eyes of a driver of an automobile from the glare of the headlights of an approaching automobile, said device comprising a lens frame including an elongated substantially rectangular bar, an arcuately shaped lens bracket fixedly secured intermediate its ends to said bar adjacent one end thereof, a substantially rectangular brace depending from said bar, said brace being spaced inwardly from said one end of said bar and being integrally connected with the adjacent inner end of said lens bracket, a temple piece hingedly connected to the other or outer end of said lens bracket, a semi-transparent lens supported from said lens bracket and occupying substantially an outer corner thereof, a second lens bracket comprising an elongated substantially rectangular member having opposed inner and outer ends, said rectangular member having integrally connected intermediate its ends a plurality of substantially hollow rectangular sleeves to slidably receive the other end of said bar therethrough whereby said second lens frame may be adjusted longitudinally of said bar, said inner end of said second lens frame terminating in a second brace disposed in confronting relation relative to said first brace, a second semi-transparent lens mounted in the inner corner of said second lens frame, a temple piece hingedly connected to said outer end of said second lens frame, and a nose tab fixedly secured to said connected ends of said first lens frame and said first brace and to said second brace, respectively.

References Cited in the file of this patent

UNITED STATES PATENTS

| | | |
|---|---|---|
| 1,135,921 | Ramsay | Apr. 13, 1915 |
| 1,723,475 | Esleck | Aug. 6, 1929 |
| 1,750,630 | Day | Mar. 18, 1930 |
| 1,963,716 | Ritchey | June 19, 1934 |
| 2,601,084 | Brown | June 17, 1952 |

FOREIGN PATENTS

| | | |
|---|---|---|
| 19,311 | Great Britain | of 1914 |
| 670,710 | France | Aug. 24, 1929 |